Dec. 16, 1969     L. A. DRAVES     3,484,091

ADJUSTABLE AUXILIARY VEHICLE SPRING HOUSING

Filed April 27, 1967     2 Sheets-Sheet 1

LEHI A. DRAVES
INVENTOR

BY
Robert K. Rhea
AGENT

Dec. 16, 1969 L. A. DRAVES 3,484,091
ADJUSTABLE AUXILIARY VEHICLE SPRING HOUSING
Filed April 27, 1967 2 Sheets-Sheet 2

LEHI A. DRAVES
INVENTOR.

BY
Robert K. Rhea
AGENT

United States Patent Office 3,484,091
Patented Dec. 16, 1969

3,484,091
ADJUSTABLE AUXILIARY VEHICLE SPRING
HOUSING
Lehi A. Draves, Rte 2, Lookeba, Okla. 73053
Filed Apr. 27, 1967, Ser. No. 634,330
Int. Cl. B60g 17/02, 11/36, 11/04
U.S. Cl. 267—54       1 Claim

ABSTRACT OF THE DISCLOSURE

An elongated leaf spring assembly is supported at one end by a housing secured to a sprung frame member of a vehicle for vertical movement of the free end of the spring assembly about a horizontal axis toward and away from unsprung members of the vehicle. Cam and gear means supported by the housing releaseably contacts the spring assembly to vary the downward pressure of its free end portion against unsprung members.

CROSS REFERENCE TO RELATED APPLICATIONS

This invention is an improvement over my copending applications for Vehicle Load Spring filed June 1, 1965, Ser. No. 460,065 and Improved Vehicle Overload Spring With Cam-Type Adjusting Means, filed Nov. 26, 1966, Ser. No. 595,848, now Patent No. 3,328,050, issued June 27, 1967.

This invention is distinctive over the above referred to applications by providing a substantially automatic remotely controlled means for rotating a cam into and out-of-contact with an auxiliary or overload spring. Furthermore, this invention includes an improved manner of mounting the overload spring for movement of the latter toward an inactivated position as well as the load support position occupied by the overload spring with respect to its contact with the associated vehicle axle housing, struts or brackets secured thereto for the purpose of increasing the spring resistance between the vehicle frame and chassis.

BACKGROUND OF THE INVENTION

The present invention relates to an improved vehicle spring and more particularly to an overload spring which may be readily attached to various types of vehicles.

The prior art discloses a number of auxiliary or overload suspension springs for vehicles of the fixed position type wherein the auxiliary spring forms a connection between the vehicle frame and a portion of the chassis which results in a rough riding vehicle as opposed to the use of only the conventional spring wherein the auxiliary or overload spring can be moved out-of-contact with the vehicle chassis and placed in operative position only when additional load on the vehicle frame renders the auxiliary spring action desirable.

Some of the prior patents, such as Nos. 1,767,750; 2,990,170; 2,304,780; 1,429,411 and 3,173,668, feature either manually adjusted linkage, screw threaded rods or adjustable brackets for activating or deactivating the auxiliary spring. Also, Patent No. 1,377,913, discloses a worm gear actuating cam for activating and deactivating an auxiliary spring. Of the above prior patents only patent No. 1,767,750 contemplates the use of an auxiliary overload spring having a free end moved toward and away from a support position of the associated vehicle.

This invention eliminates the rough riding characteristics of an overload spring equipped vehicle by providing an auxiliary spring which is pivotally connected at one end to a sprung member and is movable at its opposite free end portion by cam and spring means intermediate its ends, toward and away from contact with an unsprung member of the vehicle. Furthermore, this movement may be accomplished at the will of the operator without leaving his driving position.

SUMMARY OF THE INVENTION

This invention includes an overload spring of the leaf spring type which is pivotally connected, at one end, by a bracket or housing to the vehicle frame for vertical movement of its other end toward and away from a portion of the vehicle chassis. A motor driven worm gear and cam is supported by the housing for movement of the cam toward and away from a load bearing position of the overload spring. The overload spring normally retracts itself toward an inactivated position.

The principal objects are to provide an auxiliary or overload spring which may be readily connected with a sprung vehicle frame member employiing semi-elliptical or coil spring rear axle suspension wherein the overload spring may be adjusted for various weight supporting positions and which is remotely controlled by the operator by means of an electrical or hydraulic operated motor means rotating a cam toward and away from contact with the overload spring.

DESCRIPTION OF THE PREFERRED EMBODIMENTS

Like numerals refer to like parts throughout the various figures of the drawings.

Figure 1:
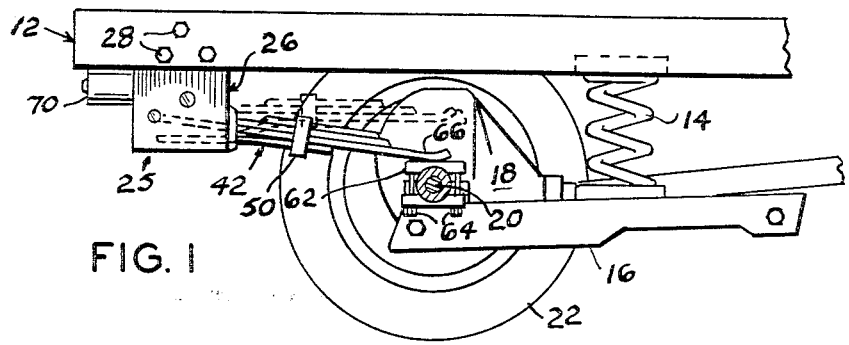
FIGURES 1 and 2 are fragmentary elevational views of the rearward portions of vehicles having the frame thereof supported by coil and semi-elliptical springs, respectively, with the overload spring connected with the frame thereof.

Referring more particularly to FIG. 1, the reference numeral 12 indicates the rearward end portion of one side of a vehicle frame supported by a coil spring 14 contacting a strut 16 connected at one end with the rear axle housing 18 having an axle 20 supporting a wheel 22. The vehicle is provided with opposite longitudinal portions of the frame 12 supported by an opposite coil spring and the other end of the axle supporting a similar wheel.

The improved overload spring assembly comprising the present invention is intended to be used in pairs with each assembly on a corresponding side of the vehicle and engaging a corresponding portion of the transverse axle housing or assembly. In the interest of brevity only one overload spring assembly and the adjacent vehicle components will be described in detail.

The overload spring assembly is designated generally by the numeral 25 and includes a housing 26 adapted to be secured in depending relation to the vehicle frame by bolts and nuts 28. Obviously rivets, or the like, not shown, may be used if desired.

Figure 5:
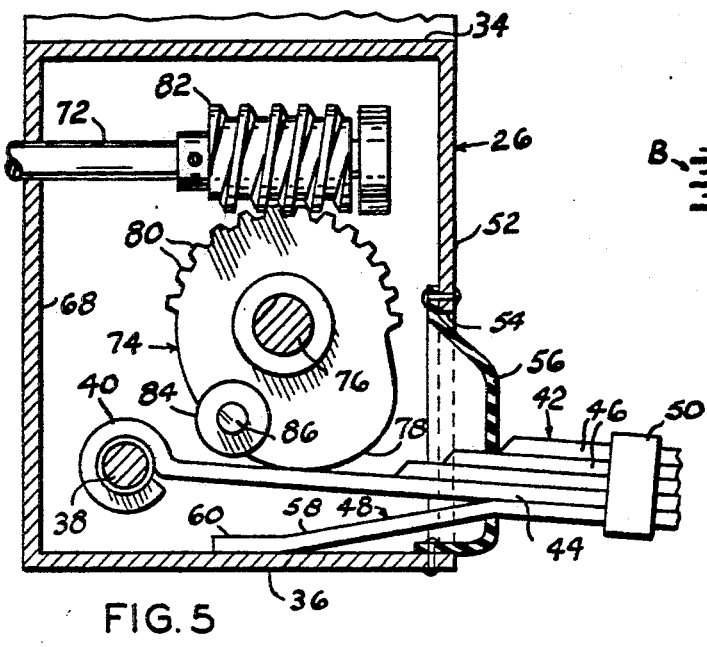
FIGURE 5 is a fragmentary vertical cross-sectional view, partially in elevation, taken through the housing connecting the overload spring to the vehicle frame and illustrating the cam means for moving the spring.
Figure 7:
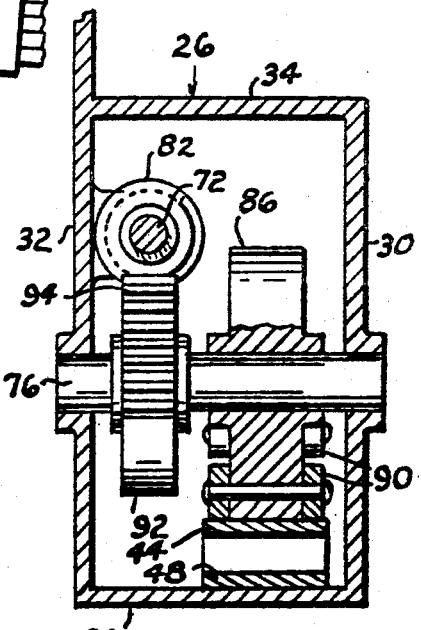
FIGURE 7 is a vertical cross-sectional view taken substantially along the line 7—7 of FIG. 6.

As shown more clearly in FIGS. 5 and 7, the housing 26 is substantially box-like having opposing side walls 30 and 32 joined by a top 34 and a bottom 36. The housing walls 30 and 32 transversely support a shaft 38 extending through the closed end portion 40 of a leaf spring assembly 42 for vertical pivoting movement of the free end portion of the spring assembly 42. The spring assembly 42 comprises a main or base elongated spring leaf or member 44 having a plurality of shorter length spring leaves 46 superposed thereon. A lift spring leaf 48 is positioned below the base spring member 44 with one end portion of the lift leaf 48 in contact therewith and held in assembled relation with the other leaves 46 by a surrounding clamp member 50. The assembled spring members 42 projects outwardly through a forward wall 52 of the housing through an opening 54. The opening 54 is closed against entry of mud, dirt or other foreign matter, by a resilient boot 56. The lift spring leaf 48 is further characterized by an opposite downwardly and rearwardly extending portion 58, as viewed in FIGS. 1 to 3, terminating at its free end portion 60 in contact with the inner surface of the lower wall 36 of the housing. The length of the spring assembly 42, particularly its base member 44, may be varied in accordance with its desired load supporting properties and is preferably of such length that its free end portion extends outwardly of the housing 26 for overlying the vehicle rear axle housing or other unsprung portions of the vehicle chassis as hereinafter described.

A load supporting clamp 62 is connected around the rear axle housing by bolts and nuts 64 so that the free end portion 66 of the spring base member 44 contacts the upper surface of the clamp 62 when the spring assembly 42 is in an activated or load supporting position.

The rear wall 68 of the housing supports a reversible motor 70 having a shaft 72 extending through and journaled by the wall 68. A disk cam 74, mounted on an axle 76 in turn journaled at its respective ends by the housing walls 30 and 32, has a portion of its periphery 78 arranged for engagement with the upper surface of the spring base member 44, adjacent its closed loop end portion 40, upon rotation of the cam. The surface of the cam, opposite the member contacting surface 78, is provided with a plurality of spur gear teeth 80 which are cooperatively engaged by a worm gear 82 coaxially secured to the end portion of the motor shaft 72 projecting into the housing. Thus it may be seen that rotation of the motor 70 in one direction rotates the cam 74 so that its surface 78 bears against the base spring 44 to force the free end portion thereof downwardly into contact with the axle housing clamp 62. During this action the resiliency of the lift spring leaf 48 is overcome by a flexing of this spring so that when the motor 70 is reversed and the cam 74 is rotated to a released position, out-of-contact with the base spring member 44, the lift spring leaf 48 raises the free end of the spring assembly 42 in an upward deactivated position, as shown by dotted lines (FIG. 1).

Movement of the cam surface 78 into contact with the base spring 44 is facilitated to prevent binding and lessen the load imposed on the motor 70 by rollers 84, only one of which is shown, mounted on opposing sides of the cam 74 by a pin 86 at the juncture where the cam surface 78 initially contacts the upper surface of the base spring member 44.

Figure 6:
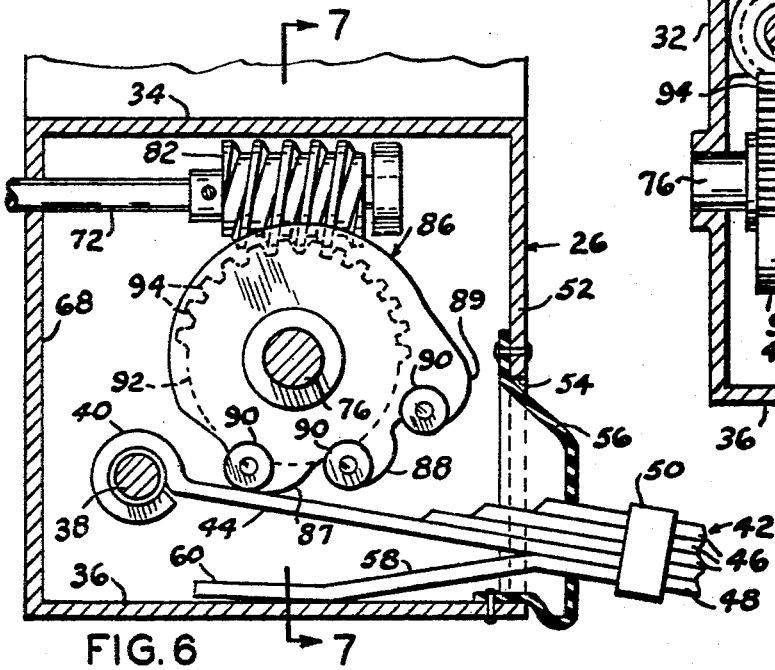
FIGURE 6 is a view similar to FIG. 5 illustrating an alternative cam arrangement.

Referring more particularly to FIGS. 6 and 7, the cam may be formed as an independent component, as indicated at 86, similarly mounted within the housing by the axle 76 in aligned relation above the base spring member 44. Ths embodiment of the cam provides a plurality of arcuate cam surfaces 87, 88 and 89, progressively projecting outwardly from the axis of the axle 76 which in turn contacts the base spring member 44 as the cam 86 is rotated. Similarly a pair of rollers 90 are respectively connected with opposing sides of the cam adjacent the respective arcuate cam surfaces 87, 88 and 89, to facilitate movement of the cam 86. In this embodiment a separate cam drive wheel 92, similarly provided with gear teeth 94, is mounted on the axle 76 in spaced relation with respect to the cam 86 for engagement by the worm gear 82.

Figures 2, 9:
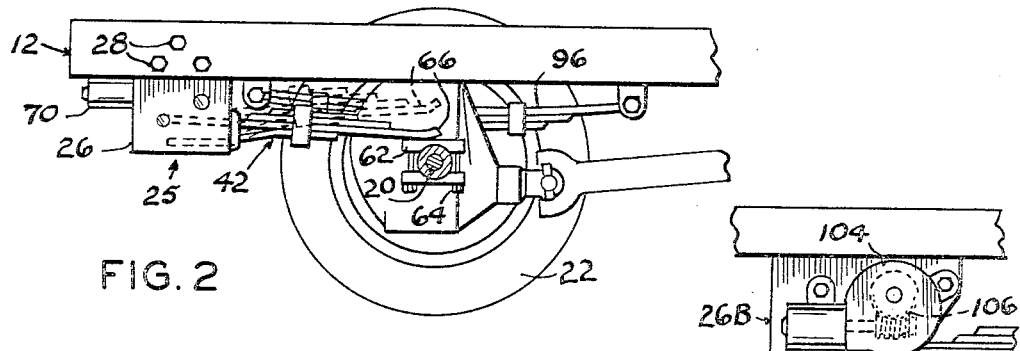
FIGURE 9 is a fragmentary elevational view illustrating the manner of mounting the motor and gears controlling the cam outwardly of the overload spring support housing; and, FIGURE 10 is a wiring diagram.

Referring more particularly to FIG. 2, the application of the auxiliary overload spring assembly 25 is illustrated in connection with a vehicle having its frame 12 supported by a conventional semi-elliptical leaf spring assembly 96.

Figure 3:
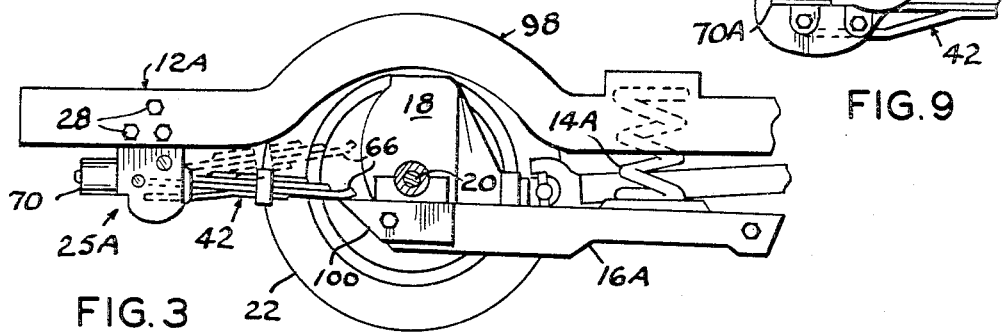
FIGURES 3 and 4 are views similar to FIG. 1 illustrating an alternative manner of supporting the free end of the overload spring by a bracket connected with a vehicle strut.

FIGURE 3 illustrates an alternative type vehicle frame 12A having a wheel well-like portion 98 bowed arcuately and upwardly above the axle housing and supported by a coil spring 14A extending between the frame 12A and a support position on the vehicle strut 16A. A bracket 100 is secured to the rearward end portion of the strut 16A which projects rearwardly thereof for supporting the free end portion 66 of the spring assembly 42.

Figure 4:
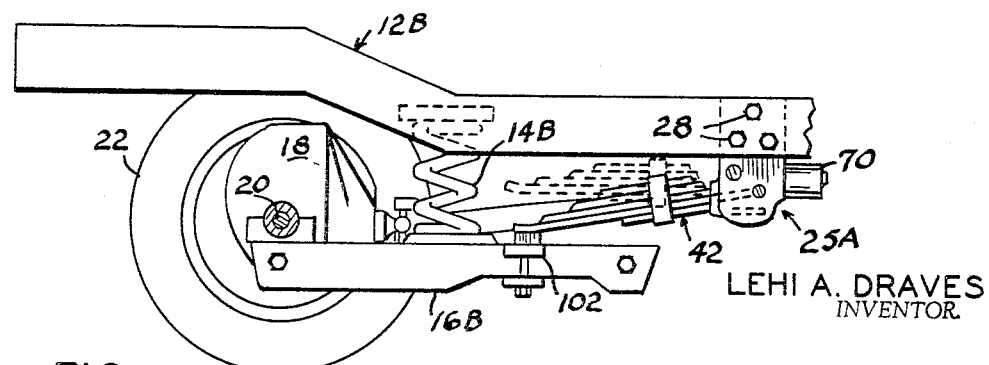

FIGURE 4 illustrates still another type of vehicle frame 12B wherein the frame is inclined rearwardly and upwardly to project horizontally in a rearward direction above the axle housing. The frame 12B is supported by a similar coil spring 14B extending between the frame and the vehicle strut 16B. In this embodiment the auxiliary overload spring assembly 25A is mounted in depending relation below the vehicle frame forwardly of the strut 16B. The spring assembly 42 projects rearwardly in overlying relation above the strut 16B which has connected thereto, by bolts and nuts, a support clamp 102 for receiving the free end 66 of the spring assembly.

Figure 8:
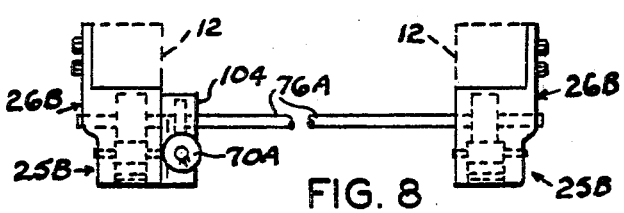
FIGURE 8 is a fragmentary rear elevational view illustrating the manner of controlling a pair of overload springs by a single motor.

FIGURE 8 illustrates the manner of interconnecting a pair of auxiliary overload spring assemblies 25B when mounted on the vehicle frame 12 so that one motor 70A may control the cams for operating the spring assemblies. This is done by extending the cam supporting shaft 76A to project transversely of the vehicle through the housing supporting each spring assembly 25B. In this embodiment the motor is connected with a worm gear containing housing 104, shown more clearly in FIG. 9, and mounted externally of the cam shielding housing 26B. Operation of the motor 70A, in a selected direction, rotates the worm gear assembly 106 connected with the shaft 76A to in turn rotate the spring contacting cams in the desired direction.

Figure 10:
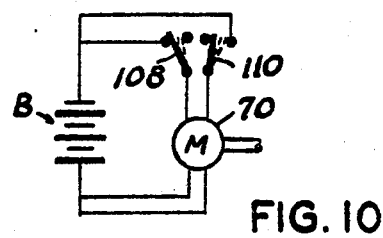

Referring now to FIG. 10, the motor 70 is connected with a battery B through a pair of switches 108 and 110 preferably mounted on the dash or cab panel of the vehicle, not shown, so that closing one switch, for example the switch 108, rotates the cam to force it into contact with the spring assembly 42. The switch 108 is then opened wherein the worm gear maintains the spring assembly in its selected position. Similarly, closing the switch 110 rotates the motor in the other direction to disengage the cam from the spring assembly permitting the spring lift leaf to raise the spring assembly toward its dotted line position, shown in FIGS. 1 to 4. Obviously limit switches may be interposed in the circuit of FIG. 10 and associated with the spring components so that actuating the motor in either direction will limit the movement of the spring assembly 42 through a predetermined vertical distance.

Obviously the invention is susceptible to some change or alteration without defeating its practicability, and I therefore do not wish to be confined to the preferred embodiment shown in the drawings and described herein.

I claim:

1. For use on an automotive vehicle having unsprung members from which a sprung member is supported for vertical movement, an auxiliary spring means comprising:
   an overload spring of the leaf spring type having a first end portion disposed adjacent one said sprung member, said overload spring having a second end portion overlying one said unsprung member;
   a closed housing connected with and depending from said sprung member, said housing having an opening admitting said first end portion of said overload spring and permitting vertical movement of the latter therein;

a shaft extending transversely through a depending portion of said housing and journalling said first end of said overload spring about a horizontal axis transverse of its longitudinal axis;

resilient means surrounding an intermediate portion of said first end portion of said overload spring and closing the opening in said housing;

an axle extending through said housing parallel with, spaced above and toward said second end portion with respect to said shaft;

a substantially disk-like cam on said axle, said cam having a camming surface overlying and engageable with the first end portion of said overload spring;

gear teeth formed on said cam opposite its camming surface;

a reversible motor mounted on said sprung member, said motor having a drive shaft entering and journalled, at its free end portion, by said housing; and, a worm gear on said drive shaft engaging the teeth on said cam.

References Cited

UNITED STATES PATENTS

| | | | |
|---|---|---|---|
| 2,301,398 | 11/1942 | Haynes | 267—16 XR |
| 2,304,780 | 12/1942 | DeFries | 267—28 XR |
| 2,969,230 | 1/1961 | Scheublein et al. | 267—16 |
| 3,083,034 | 3/1963 | Hollowell | 267—36 |
| 3,170,712 | 2/1965 | Hildebrandt et al. | 280—124 |
| 3,302,941 | 2/1967 | Giovinazzo | 267—17 |
| 3,328,050 | 6/1967 | Draves | 267—16 XR |

ARTHUR L. LA POINT, Primary Examiner

H. BELTRAN, Assistant Examiner

U.S. Cl. X.R.

267—15, 16, 22, 28, 36, 56, 89; 280—124